(12) United States Patent
Publicover

(10) Patent No.: US 6,542,636 B2
(45) Date of Patent: *Apr. 1, 2003

(54) METHOD AND SYSTEM FOR COMPUTERIZED HIGH RATE IMAGE PROCESSING

(75) Inventor: Nelson George Publicover, Reno, NV (US)

(73) Assignee: Board of Regents of the University and Community College System of Nevada, Reno, NV (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/026,689

(22) Filed: Feb. 20, 1998

(65) Prior Publication Data

US 2001/0055424 A1 Dec. 27, 2001

Related U.S. Application Data

(60) Provisional application No. 60/037,419, filed on Feb. 21, 1997.

(51) Int. Cl.[7] .................................................. G06K 9/66
(52) U.S. Cl. ..................... 382/195; 382/321; 382/322
(58) Field of Search .................. 382/321, 195, 382/322, 323, 324, 141

(56) References Cited

U.S. PATENT DOCUMENTS

| | | | | |
|---|---|---|---|---|
| 4,137,625 A | | 2/1979 | White .......................... 29/577 |
| 4,233,625 A | * | 11/1980 | Altman ........................ 358/101 |
| 4,566,788 A | | 1/1986 | Buczek .......................... 356/4 |
| 4,651,211 A | | 3/1987 | Weckenbrock et al. ...... 358/166 |
| 4,845,731 A | * | 7/1989 | Vidmar et al. ................. 378/98 |
| 4,999,703 A | | 3/1991 | Henderson .................... 358/60 |
| 5,008,521 A | * | 4/1991 | Ohki et al. ................... 382/324 |
| 5,214,294 A | * | 5/1993 | Toyofuku .................... 150/561 |
| 5,245,191 A | * | 9/1993 | Barber et al. .......... 250/363.04 |
| 5,291,293 A | | 3/1994 | Kapan ......................... 348/246 |
| 5,359,383 A | * | 10/1994 | Miida et al. ................. 354/402 |
| 5,416,616 A | * | 5/1995 | Jenkins et al. ................. 359/11 |
| 5,463,459 A | * | 10/1995 | Morioka et al. ........ 250/559.36 |
| 5,550,938 A | * | 8/1996 | Hayakawa et al. .......... 382/321 |
| 5,596,190 A | * | 1/1997 | Li et al. ...................... 250/236 |
| 5,818,062 A | * | 10/1998 | Baba et al. ............. 250/559.36 |
| 5,970,115 A | * | 10/1999 | Colbeth et al. ................ 378/62 |

\* cited by examiner

Primary Examiner—Thomas D. Lee
(74) Attorney, Agent, or Firm—Morgan, Lewis & Bockius LLP

(57) ABSTRACT

A method and system provides computerized high-rate image processing. Each detecting element receives electromagnetic radiation and produces an electrical detection signal according to an amount of electromagnetic radiation received on the respective detecting element. The electrical detection signals of each detection element corresponding to an assigned region of interest in the field of view. The electrical detection signals of all detecting elements assigned to the same region of interest are summed to produce an output signal.

21 Claims, 12 Drawing Sheets

METHOD AND SYSTEM FOR COMPUTERIZED HIGH RATE IMAGE PROCESSING

This application claims the benefit of U.S. Provisional Application Ser. No. 60/037,419 filed on Feb. 21, 1997, which is hereby incorporated by reference.

BACKGROUND OF THE INVENTION

1. Field of the Invention

The present invention relates to image processing, and more particularly to a method and system for computerized high-rate image processing.

2. Discussion of the Related Art

In recent years, computerized data acquisition for imaging has become a state-of-the-art technique in a wide variety of applications. Imaging is being used, for example, to automatically detect manufacturing faults, to convert typed and hand-written text into a digital format, and to examine the spread of electrical excitation in biological tissues.

Conventional techniques have been developed with frame rates comparable to those associated with broadcast video (60 non-interlaced frames/sec). In these systems, a camera having an array of pixels images an entire field of view which includes at least one region of interest within the field. The entire image is then transferred to a computer for processing as an array of pixels defining a frame. In the computer, the frame sequences are processed using software to analyze the regions of interest. In many applications, the desired analysis may be a quantity such as a time signature of the sum of intensities from a number of pixels in each region of interest. However, because the entire image frame is transferred to the computer for processing, data handling and transfer limits the obtainable frame rate.

To extend the frame rate, specialized systems have been developed having frame rates up to approximately 1,000 frames/sec. These systems store up to several thousand images in large banks of solid state memory for off-line play-back, processing, and analysis. Hence, the memory requirements cause these systems to be expensive (often costing in excess of US$100,000) and limited in spatial resolution. Further, these systems do not process data in "real time".

Other specialized systems have been developed with frame rates up to 1 million frames/sec. However, these systems require several cameras (generally, two to ten cameras) in which each stores a single image in "flash" memory with no online processing. Hence, these systems are generally not suitable because they can only process a few images (generally, two to ten) at a time.

SUMMARY OF THE INVENTION

Accordingly, the present invention is directed to a method and system for computerized high-rate imaging that substantially obviates one or more of the problems due to limitations and disadvantages of the related art.

An object of the present invention is to provide an image processing system and method which can operate at high-rates.

Another object of the present invention is to provide an image processing system and method which is easily and economically manufactured.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for image processing comprises the steps of receiving electromagnetic radiation on first and second detecting elements; producing first and second electrical detection signals from the first and second detecting elements, respectively, each of the electrical detection signals corresponding to an amount of electromagnetic radiation received on a corresponding one of the detecting elements; and summing the first and second electrical detection signals to produce an output signal.

In another aspect, the system for image processing comprises first and second detecting elements for receiving electromagnetic radiation; means for producing first and second electrical detection signals from the first and second detecting elements, respectively, each of the electrical detection signals corresponding to an amount of electromagnetic radiation received on a corresponding one of the detecting elements; and means for summing the first and second electrical detection signals to produce an output signal.

In another aspect, the system for image processing comprises a first detecting element responsive to a first amount of incident electromagnetic radiation thereon to produce a first electrical detection signal corresponding to the first amount of incident electromagnetic radiation; a second detecting element responsive to a second amount of incident electromagnetic radiation thereon to produce a second electrical detection signal corresponding to the second amount of electromagnetic radiation; comparator circuitry coupled to the first and second detecting elements, the comparator circuitry determining if each of the first and second detecting elements are assigned to a selected region of interest; and summing circuitry coupled to the first and second detecting elements, wherein if both the first and second detecting elements are assigned to the selected region of interest, the comparator enables the first and second electrical detection signals to be received and analog added by the summing circuitry to produce an output signal.

In another aspect, the system for image processing comprises an array of detecting elements having a subset of detection elements corresponding to a region of interest, each detecting element in the array responsive to incident electromagnetic radiation to produce a respective electrical detection signal corresponding to an amount of electromagnetic radiation incident thereon; and pre-processor circuitry coupled to the array of detecting elements wherein the electrical detection signals from the subset of detecting elements corresponding to the region of interest are analog added to produce an output signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

The present invention achieves high frame rates in a wide range of applications by data pre-processing and acquisition in real-time. In accordance with an embodiment of the present invention extremely high frame rates are obtained by summing intensity information from each pixel in the regions of interest using high-speed analog circuitry. Summed intensities are converted to numeric values and transmitted to a computer via a high-speed interface. Because only summed values (not raw images) are transferred to the computer, this embodiment cannot be used with all imaging applications. However, summing intensities from sets of pixels is performed as an initial step in many, if not most, image processing applications allowing this technique of the present invention to be used over a wide range of applications. Accordingly, the performance of some applications can be improved as compared with the performance of conventional techniques. In other applications performance levels can be achieved that are unattainable using conventional techniques.

Figure 1:
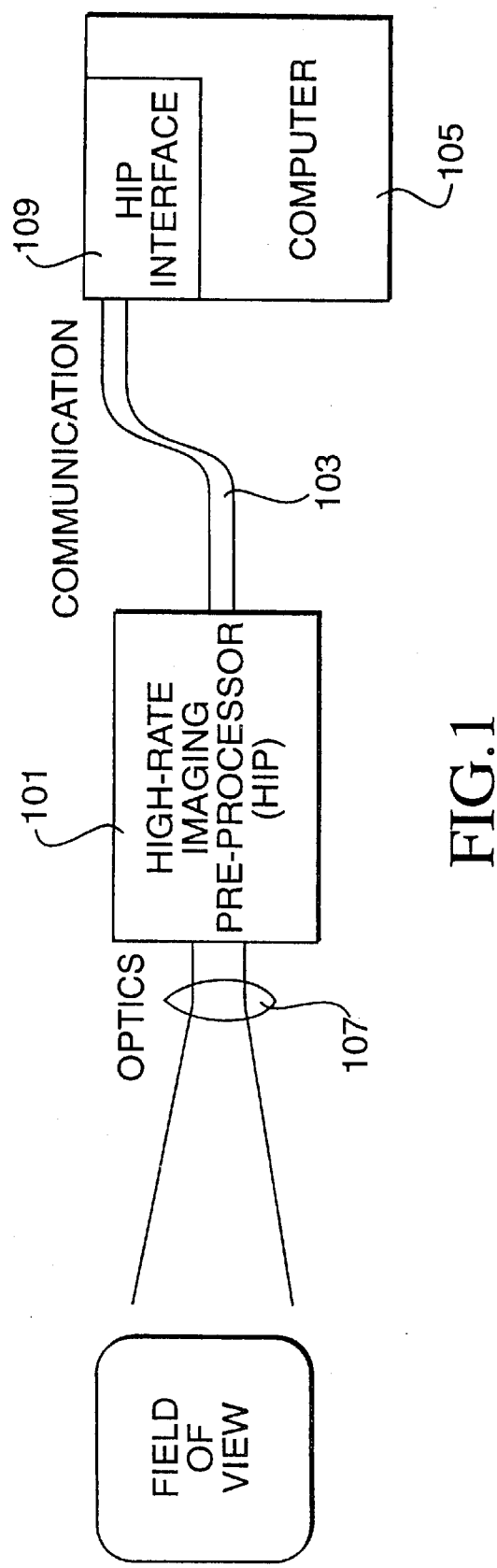
FIG. 1 shows a computerized high-rate image processing system according to an embodiment of the present invention.

Generally, the computerized high-rate image processing system of the present invention comprises a pre-processor and a processor. FIG. 1 shows a computerized high-rate image processing system according to one embodiment. Here, the system comprises a pre-processor 101 having an array of sensing elements ("pixels") and pre-processor circuitry, a communications pathway 103, and a processor 105.

Referring to FIG. 1, the pre-processor 101 measures incident electromagnet radiation and sums total intensities for each region of interest. In a preferred embodiment, the summing can be accomplished using high speed analog circuitry. Therefore, the pre-processor incorporates both analog and digital circuitry. Further, the sensing elements and the pre-processor circuitry can be integrated into a high-rate imaging preprocessor (HIP) chip. This can be achieved, for example, using VLSI/CMOS technology with a backlit two-dimensional rectangular pixel array. Further, the pixel array is sensitive to electromagnetic radiation including visible light, X-rays, ultraviolet light, infrared light, or combinations thereof. Depending on the application, optics 107 may also be used to focus the field of view on to the pixel array. Further, the optics, detecting elements, and the pre-processor circuitry can be integrated as a camera. The communications pathway 103 can be implemented as a conventional parallel or serial communications cable. The system is capable of operating under a number of standard computer platforms including but not limited to small (e.g. single chip) computer controllers, multichannel analyzer, desktop microcomputers (e.g. Pentium (TM) based systems), or mainframe computers. In the embodiment of FIG. 1, the processor is a computer 105 supporting an HIP interface 109 and processing software (not shown).

Figure 2:
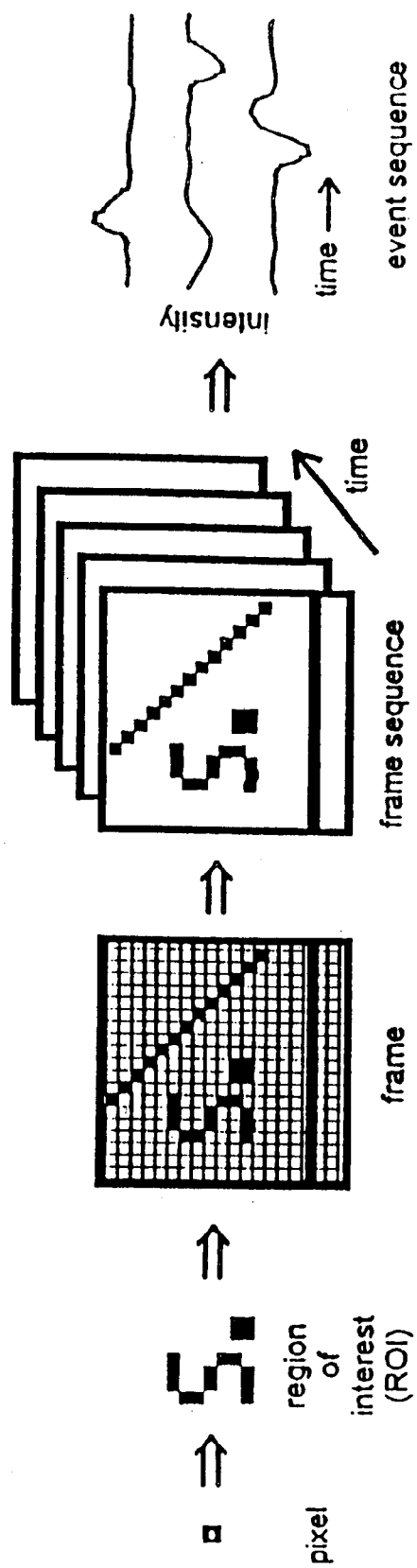
FIG. 2 shows concepts and components for the data collection process according to the present invention.

Some concepts and components for the data collection process will now be explained with reference to FIG. 2.

A pixel is an individual (light) sensing element. A region of interest (ROI) is a collection of pixels. Every pixel within a region of interest is assigned an ROI value and no pixels outside the ROI are assigned that value. A region of interest may be arbitrary in shape, size, or location. Also, a region of interest does not need to be contiguous. For example, a region of interest may be as small as a single pixel or cover most of an entire frame. Moreover, the regions of interest for a field of view may be defined within a computer with all of its computational and graphics capabilities in order to satisfy the specific processing needs of a particular application. In the example of FIG. 2, the three regions of interest are a horizontal line, a diagonal line, and an "S." region. Here, the "S." region is a non-contiguous region of interest.

A frame is an array of pixels that make up all available sensing elements. Accordingly, the regions of interest are defined within the frame. Usually, a rectangular array is used but any desired shape may be selected. Typical arrays might consist of 512×512 pixels. As will be explained, pre-processor timing is not dependent upon the number of pixels but on the number of regions of interest, thereby allowing extremely large arrays (e.g. 8,192×8,192) to be utilized without compromising speed.

By collecting data from a series of frames, it is possible to obtain a time signature (or traces) to study the dynamics of the total intensity in each region of interest. For example, the event sequence can be displayed on a screen as a series of simultaneously-collected time signatures, thereby facilitating further data analysis. Note that the entire frame does not need to be stored or transferred, only values representing summed intensities for each region of interest. As a result, the technique of the present invention can significantly reduce the quantity of data by a factor of 10,000 or more, thereby permitting high frame rates to be analyzed.

As discussed above, the regions of interest can be arbitrary in form. Furthermore, it is possible to change the regions of interest online to rapidly adapt to changes according to the data requirements. Alternatively, the regions of interest can be fixed.

Generally, the events to be studied can be categorized according to time-varying changes in intensity at static locations, translation, rotation, and combinations thereof. The regions of interest can then be selected in consideration of such categorizations. Exemplary cases will now be discussed with reference to FIGS. 3A through 3C and FIGS. 4A through 4D.

Figure 3A:
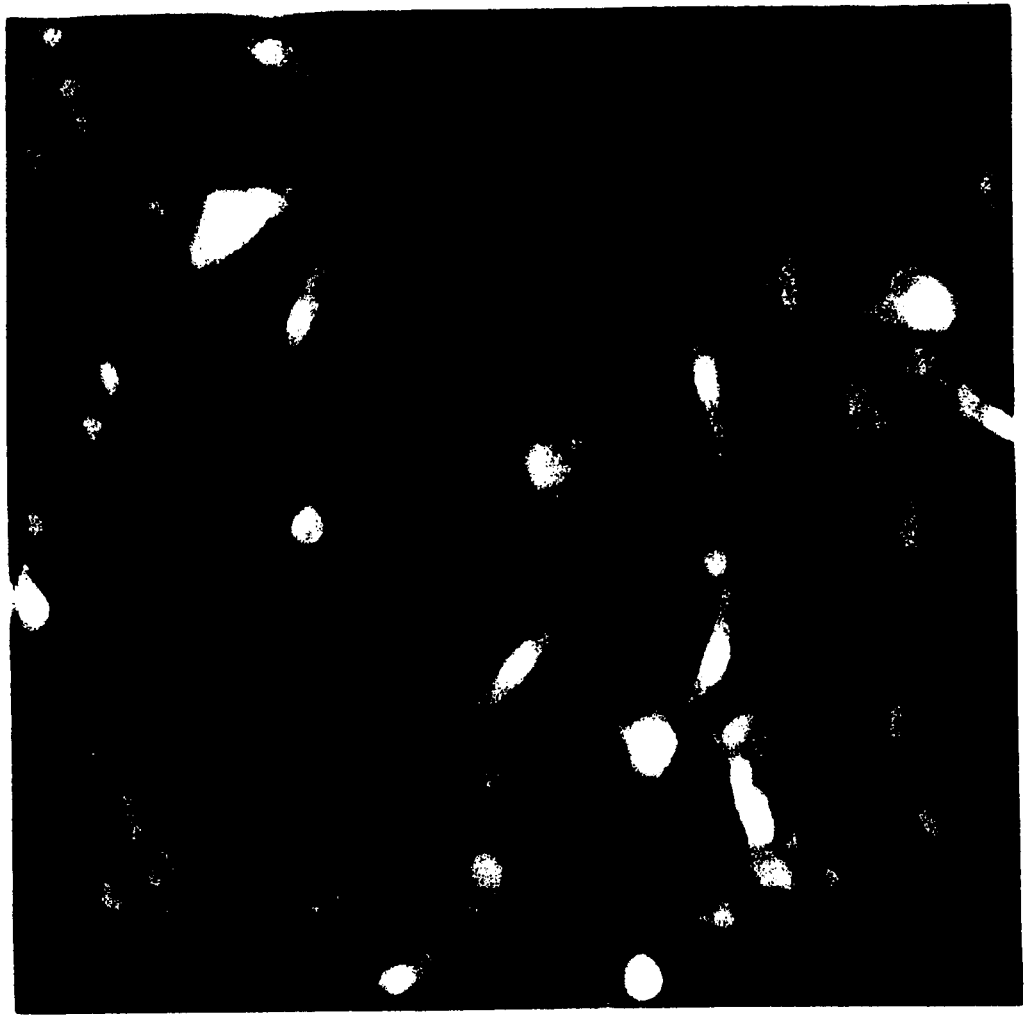
FIGS. 3A through 3C show an exemplary case of the image processing according to the present invention.
Figure 3B:
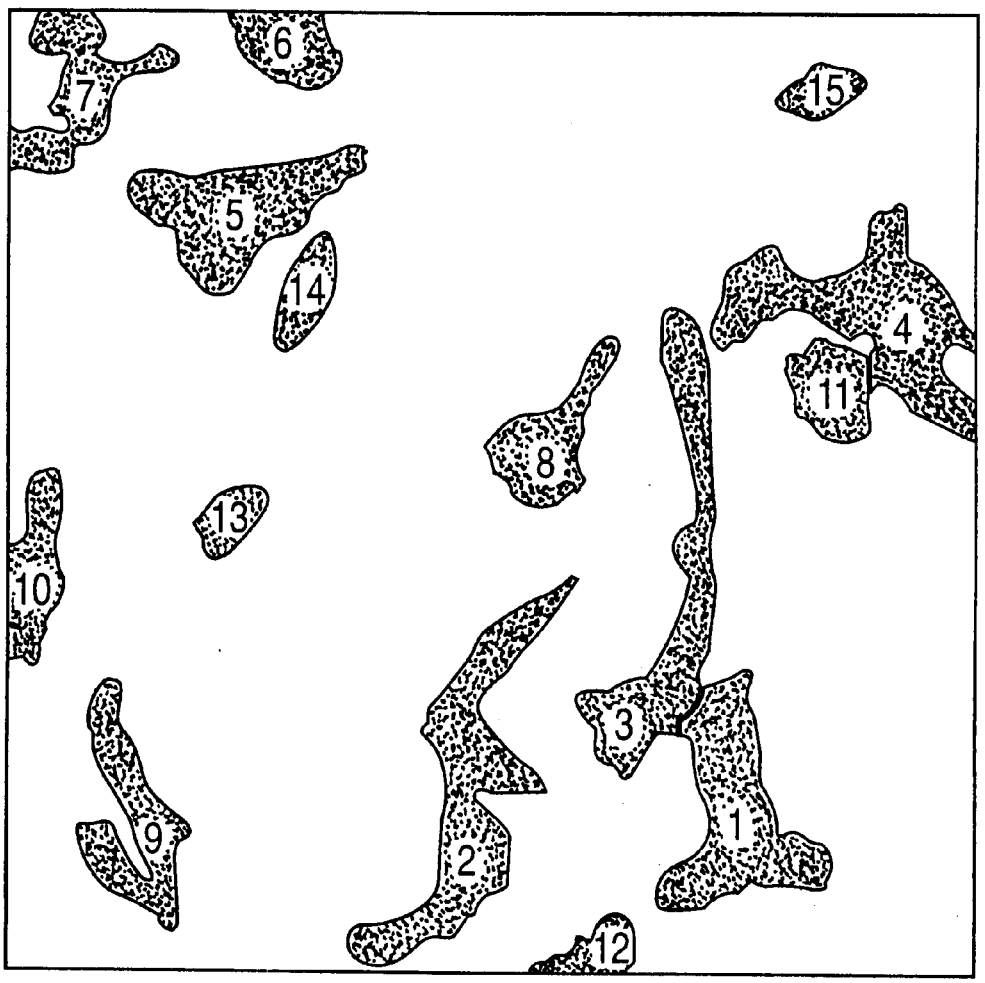
Figure 3C:
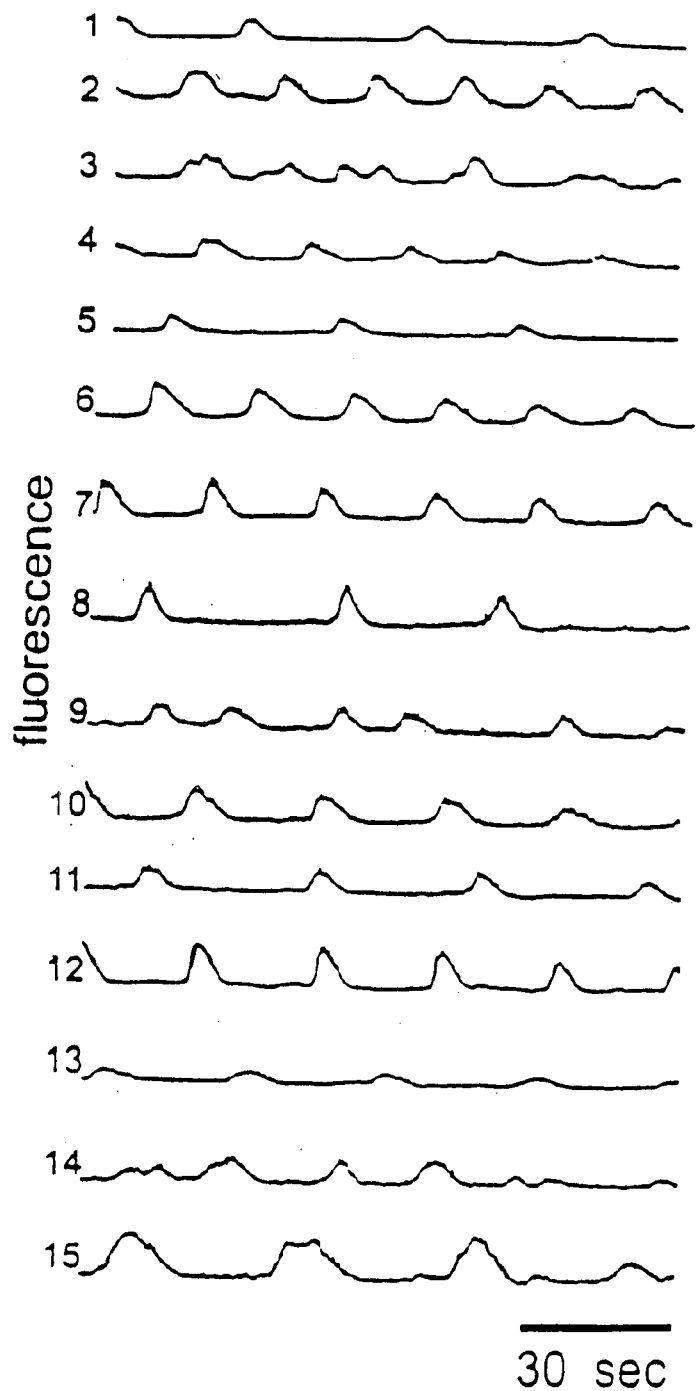

While FIGS. 3A through 3C do not show actual data taken using the present invention, FIGS. 3A through 3C show an example wherein changes in intensity are monitored at static locations. Specifically, FIG. 3A is a image frame taken from an actual on-line measurement of intracellular calcium concentrations using a fluorescent dye (fluo-3). FIG. 3B identifies a number of cells which are "pacemaker" cells within a gastrointestinal tract. These pacemaker cells are used to define the regions of interest. FIG. 3C shows the time signatures from the summed intensities of each pixel in each region of interest. While these particular cells generate extremely slow changes in intracellular calcium, other biological events occur much more rapidly. For example, neural events require time resolutions on the order of 1 millisecond. Further, optical investigation of other phenomena requires even faster times. Thus, these phenomena are well beyond the capabilities of conventional techniques. However, with the high-rate image processing of the present invention, the desired time resolution can be achieved.

Figure 4A:
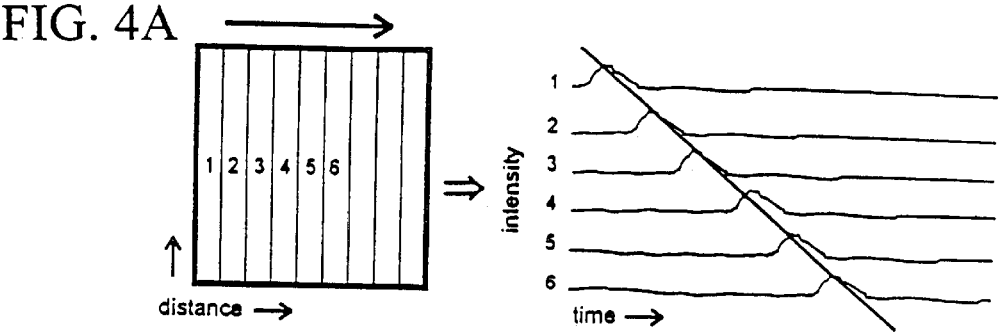
FIGS. 4A through 4D show exemplary cases of image processing using different regions of interest according to the present invention.

FIG. 4A shows an exemplary case of translation wherein an object sweeps across the field of view. Here, the object might project an image that is as small as a few pixels or be sufficiently large that only the leading edge is encountered. In FIG. 4A, the regions of interest that are shown might be used if the direction of propagation of a dynamic event were known and the object were small (e.g. a bullet) or if the object sweeps the field of view primarily as a planar wave front (e.g. vibration of a large object). Specifically, six rectangular regions of interest are numbered in the field of view (left panel). From the peaks, slopes, or valleys in the time signature (right panel) of the detected light intensity, it is possible to determine quantities such as conduction velocity for a known frame rate and magnification of the field of view. Here, the slope of the line measured in FIG. 4A is proportional to conduction velocity in the case of a projectile, or oscillatory frequency in the case of a vibrating object.

Figure 4B:
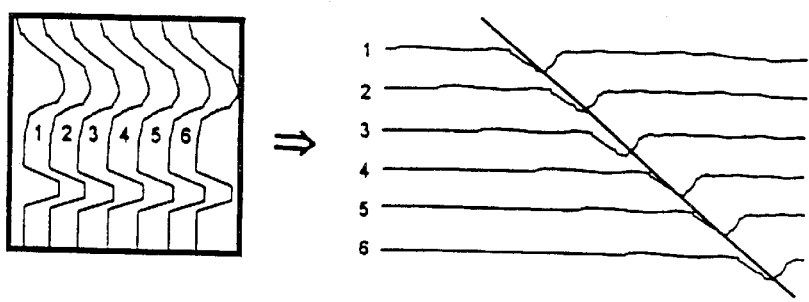

The example of FIG. 4B is similar to that FIG. 4A except the regions of interest have a complex shape. Accordingly, the regions of interest can be selected to correspond to any wave front of objects sweeping across the field of view. An exemplary case would include a system for monitoring a high-speed assembly line where objects with irregular shapes pass through the field of view. As in the case of FIG. 4A, one can measure, for example, conduction velocities, variations in conduction velocities, or anomalies in the wave form of a given event. In the case of an assembly line, one could monitor for defects in the assembly line process.

Figure 4C:
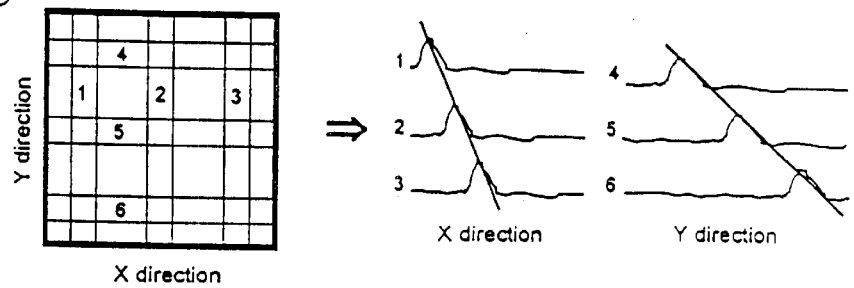

FIG. 4C shows an example of regions of interest for measuring the conduction velocity of an object passing through the field of view from an arbitrary direction. Accordingly, the regions of interest are spaced in the field of view with respect to the X and Y directions. While not shown, pixels in the regions where regions of interest intersect can be shared, for example, by assigning alternate pixels to each region of interest. Accordingly, conduction velocities can be computed from the components in the X and Y directions according to $v=\sqrt{x^2+y^2}$, where x and y are the conduction velocities components in the X and Y directions, respectively, and where v is the total conduction velocity. Likewise, direction can be computed from $\theta=\tan^{-1}(y/x)$.

Figure 4D:
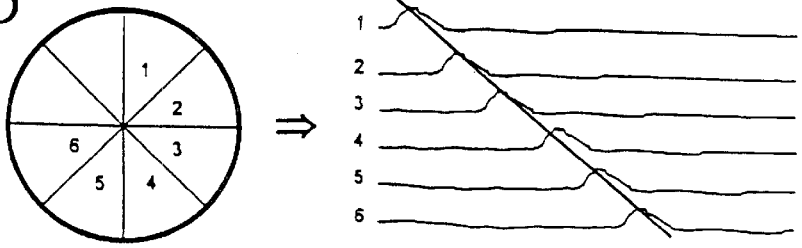

FIG. 4D shows an exemplary case involving rotation around a central point, origin, or axis. Rotating objects can often be viewed for a number of repetitive cycles. FIG. 4D shows an example of a region of interest table that might be used to analyze the rotation of objects. As an example, angular velocities can readily be computed given the frame rate and the number of regions of interest per revolution. Moreover, one can also determine variations in angular velocity, as a function of location and/or time, and whether a specific component of the rotating object varies as compared to others (e.g. one blade of a helicopter rotor or a fin within a turbine engine).

Because of the numerous advantages, especially with respect to increased real-time frame rates, achieved by the image processing technique of the present invention, there is an extremely wide range of applications that can be facilitated. While not inclusive, some exemplary applications and processes that would be facilitated and/or enabled by the technique of the present invention would include: visualization and quantitative assessment of moving parts within modern engines and machinery (either as a single event or a process that is rapidly repeated); fault detection in high-speed assembly lines (including the ability to re-construct events that lead to the fault); observation of the actual formation of fractures and other faults in structures and components (beams, bearings, etc.); observation of the rapid formation of assemblies and structures during materials processing (crystals, polymers, etc.); "crash testing" and analyses of other destructive events (whether intentional or spontaneous); fluid and semi-fluid dynamics analyses (e.g. vortex or turbulence formation); event re-construction in electronic circuits (frequently using infrared and/or X-ray sensors); measurements of the velocities of projectiles and missiles; assessing performance characteristics of rotating objects such as helicopter blades and turbines including assessment under load conditions; vibration detection and analysis in a wide range of man-made and natural objects; detection and visualization of products generated by chemical and biochemical reactions; visualization of events within biological tissues and cells (frequently using dyes, fluorescent probes and other agents to detect the presence, formation or movement of specific compounds); continuous monitoring of component performance within machinery in order to alert operators to emergency situations or to help schedule maintenance; deformation analysis during the impact of two or more objects (potentially viewed with more than one high-rate processor); detailed assessment of the performance of illumination sources (lasers, arc lamps, etc.); or the like.

While the computerized high-rate imaging system according to the present invention can be configured in any number of ways, FIGS. 5 through 10 represent an exemplary embodiment.

Figure 5:
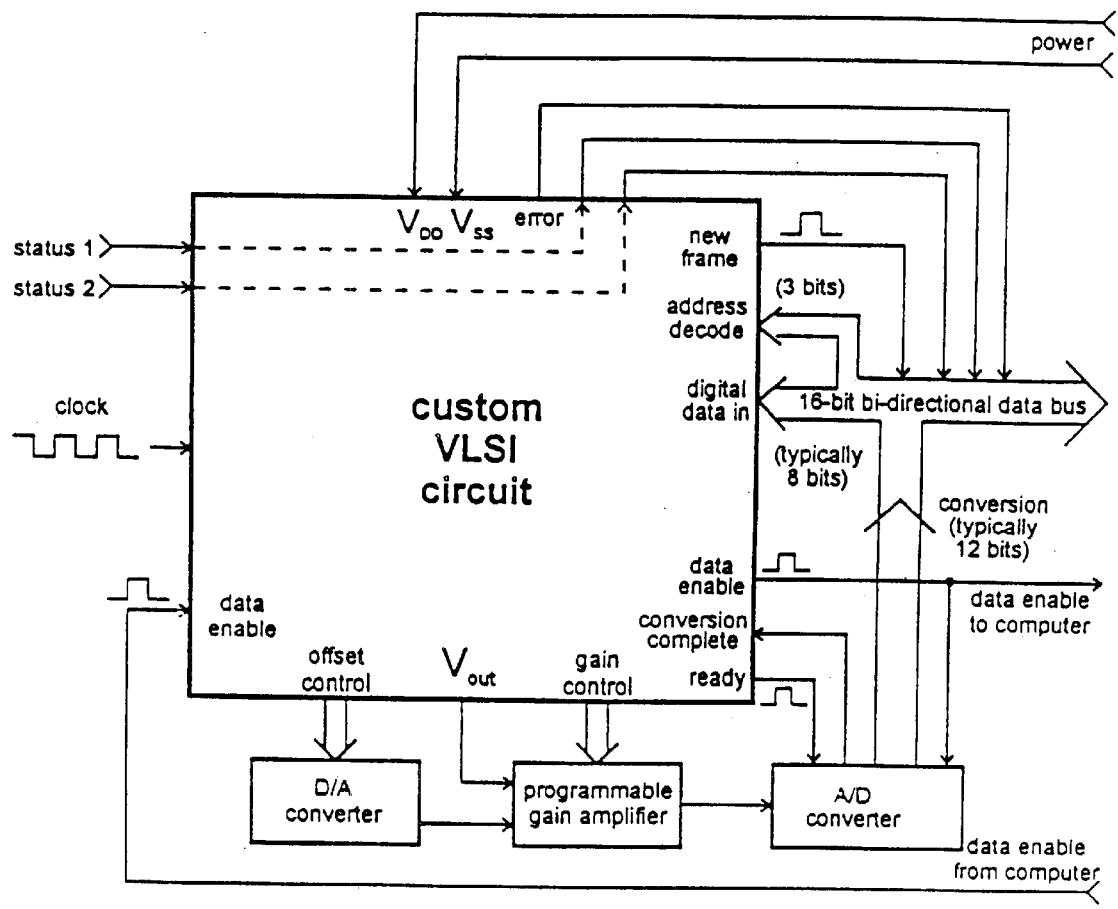
FIG. 5 shows a plan view of a pre-processor according to an embodiment of the present invention.
Figure 6:
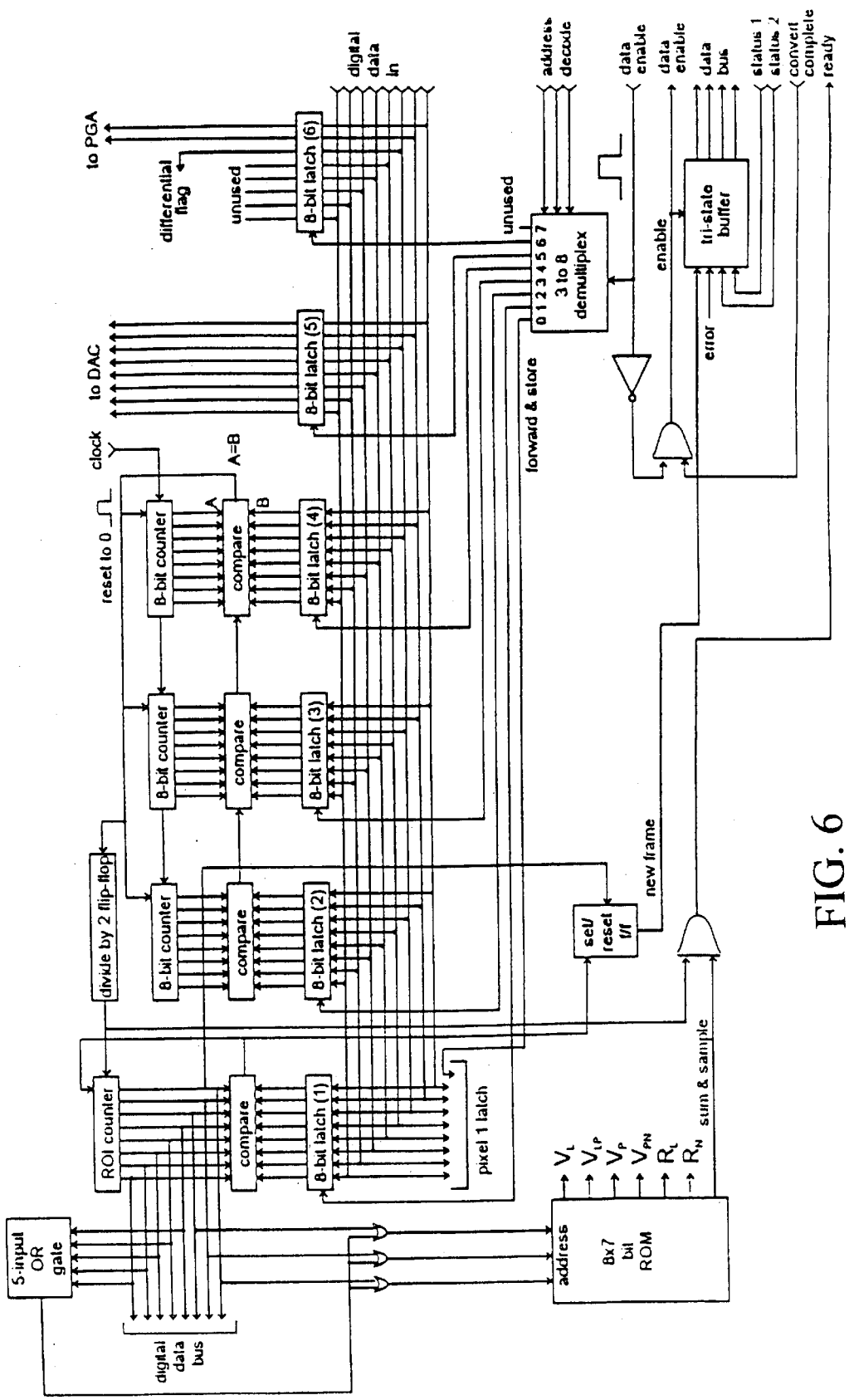
FIG. 6 shows a schematic diagram of the circuitry for operating the pre-processor of FIG. 5.

FIGS. 5 and 6 show a pre-processor chip and the circuitry for operating the pre-processor chip. An exemplary layout of the a pre-processor chip is illustrated in FIG. 5. That is, the pre-processor chip is a specific, custom-design CMOS VLSI circuit for performing light-sensing, charge accumulation, and timing/control of digital and analog signals. A preferred embodiment of a pre-processor chip integrates a backlit two-dimensional pixel array. For each region of interest, the circuit produces a voltage which is converted to a numeric value by a high-speed analog-to-digital (A/D) converter. Additional conditioning of the voltages for each region of interest is performed by a digital-to-analog (D/A) converter and programmable-gain amplifier (PGA) that provide software-programmable offset and gain control, respectively. An external clock (e.g. crystal) provides a reference timing signal. Two binary status flags (0 or +3~5 volt) flags can optionally be provided via connectors attached to the pre-processor case. These signals are buffered and conveyed to the computer for use in synchronization of display and/or timing measurements under software control. Communication with the computer involves digital voltages (e.g. within cables) or digital signals (e.g. during wireless communication) as shown on the right side of FIG. 5, thereby minimizing the need for specially-conditioned lines or signals.

Figure 7:
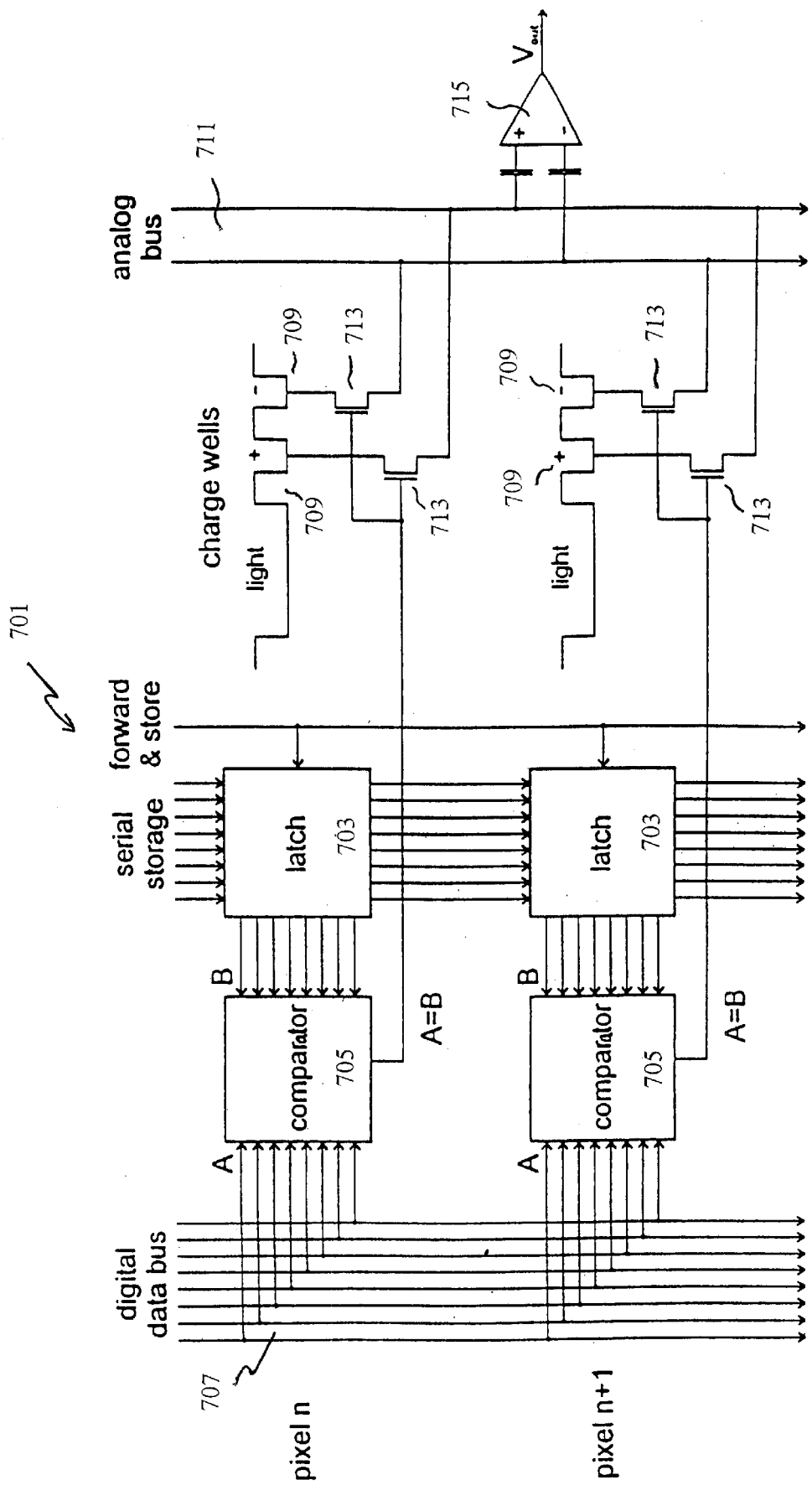
FIG. 7 shows a schematic diagram of the logic circuitry associated with each light detecting pixel of the pre-processor of FIG. 5.

An exemplary circuit for the operation of the custom VLSI preprocessor chip of FIG. 5 is shown in FIGS. 6 and 7. The circuit of FIG. 6 primarily illustrates circuitry to control the flow of information and timing. While designs with a different byte size (i.e., determining the maximum number of regions of interest) are possible, 8 bits will be used for illustration purposes. Data is sent to the chip in 8-bit "bytes" with a 3-bit "address". The "address" is used to direct data from the computer to storage registers ("latches") within the pre-processor chip as listed, for example, in Table I.

TABLE I

Peripheral Storage Decode (3 bit address)

| address | storage location |
|---|---|
| 0 | forward and store pixel latches [incoming data stored in pixel latch 0] |
| 1 | ROI counter (value typically equal to number of ROI's + 7) |
| 2 | high byte clock divide-by counter latch (most significant byte) |
| 3 | intermediate byte clock divide-by counter latch |
| 4 | low byte clock divide-by counter latch (least significant byte) |
| 5 | digital-to-analog converter latch |
| 6 | programmable gain amplifier control (2 bits) differential input control (1 bit) 5 bits unused (expansion) |
| 7 | unused (expansion) |

The basic clock frequency applied to the chip is reduced by a 24-bit "divide by n" counter. This is performed, for example, by resetting the 24-bit counter (i.e., three 8-bit counters) to 0 when the count stored in latch 2, latch 3, and latch 4 is reached. In this manner, the computer can select any frequency from the primary clock frequency (typically in excess of 150 million/second) to the same frequency divided by any value up to $2^{24}$ (approx. 16 million). The resulting frequency can be further divided by 2 via a flip-flop to ensure a consistent (50%) duty cycle. The signal is then fed to a ROI counter (typically 8 bits). This counter steps through each region of interest according to a specific number of clock cycles required to sum charges and to control charge movement. As will be described, each region of interest typically requires one clock cycle to sum charges. Seven additional clock cycles are typically required to process each frame. The computer controls the number of regions of interest by the value stored in latch 1. The value in latch 1 is typically equal to the number of regions of interest plus seven.

Figure 8:
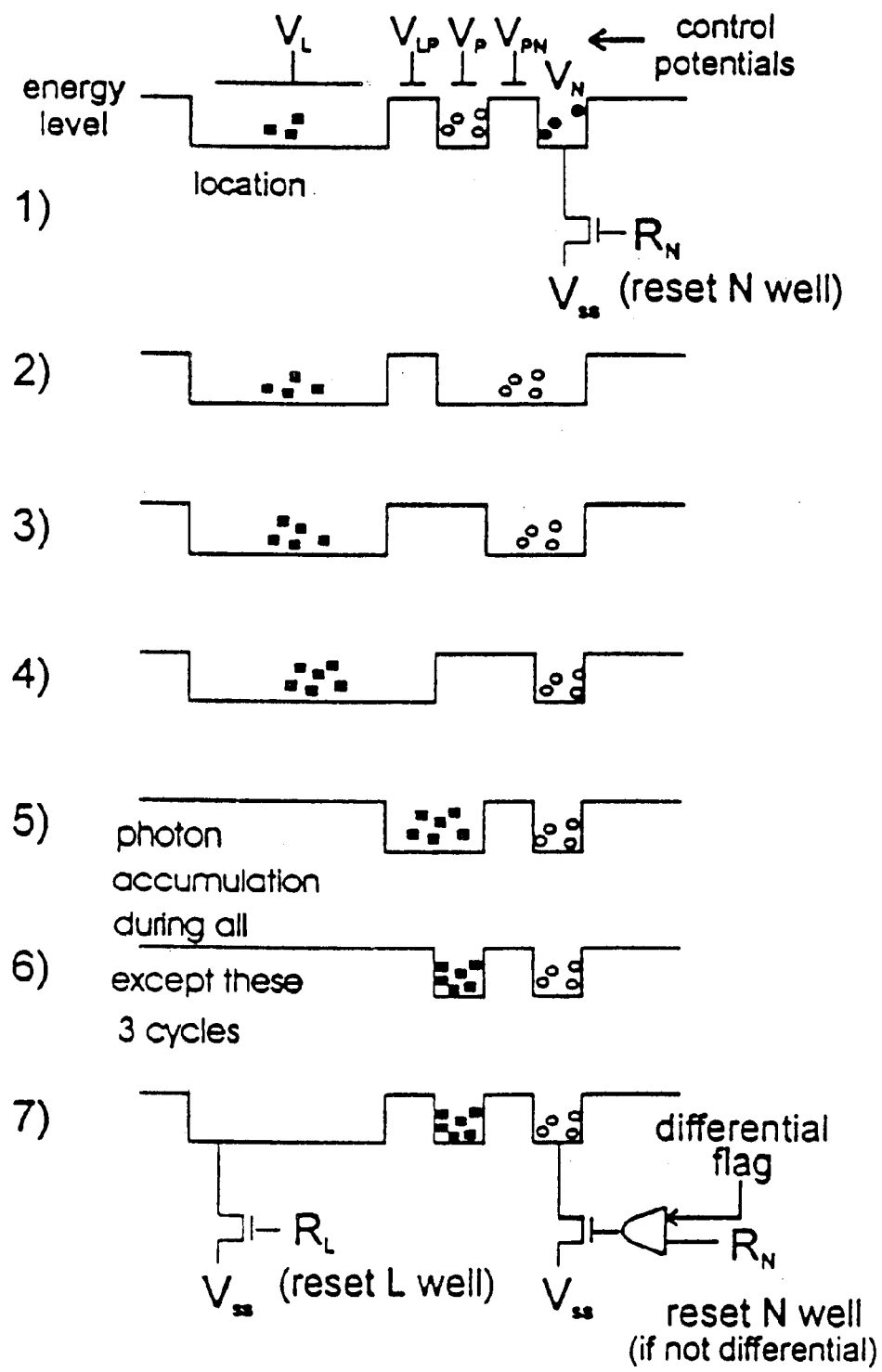
FIG. 8 shows a process sequence used to control the movement of charge in one embodiment of a light detecting pixel.

Initial values (0 through 6) within the ROI counter are used to control the movement of charge as illustrated in FIG. 8. Here, charge accumulation corresponds to photon accumulation, i.e., incident intensity. The symbols describing control potentials for each charge well are listed in Table II. The sequence of voltages move charge stored in the positive well controlled by $V_P$ into the negative (or reference) well controlled by $V_N$, and then from the light-sensitive well controlled by $V_L$ into the positive well.

As shown in FIG. 8, charges have accumulated in the light-sensitive well in response to incident photons and the negative well is reset to clear any charges therein in the first clock cycle. Here, the negative well is illustrated as containing the charges to be cleared. Then, the process to move charges from the positive well to the negative well begins by combining the positive well with the reset negative well by applying a voltage $V_{PN}$ in the second clock cycle. In the third clock cycle, the charges in the combined positive and negative well are consolidated toward the negative well by turning off $V_P$. In the fourth clock cycle, the consolidation of the charges into the negative well is completed by turning off $V_{PN}$. In addition, the process to move charges from the light-sensitive well to the positive well begins by turning on $V_{LP}$. Then, in the fifth clock signal, the charges are move out of the light sensitive well toward the positive well by turning of $V_L$. Next, the consolidation of the charges into the positive well is completed by turning off $V_{LP}$ in the sixth clock cycle. Finally, in the seventh clock cycle, the light-sensitive well is reset and available for charge accumulation in response to incident photons. During subsequent clock cycles, the positive and negative wells are summed for each region of interest, and the process is ready to be repeated. In this process, charges are allowed to accumulate during the first through fourth clock cycles. Also, the light-sensitive wells accumulate charge while all regions of interest are processed, thereby maximizing the signal-to-noise ratio.

This arrangement of FIG. 8 allows either measurements of actual charges accumulated between measurements or the difference in charge accumulation in a measurement as compared to a previous measurement. If difference (i.e. differential) images are required, the charge different between the positive and negative wells is measured. Otherwise, the negative well is drained of charge at the same time accumulation is initiated in the light-sensitive well (providing a reference voltage for noise cancellation). Voltages are synchronized by an 8×7 bit read-only-memory (ROM) where the 3 address lines are the three least significant bits of the ROI counter. The values stored in the ROM are listed in Table II. If any of the most significant bits of the ROI counter are 1, the ROM address is set to 7 (using three OR gates) which sets the control voltages to a normal light gathering and data accumulation state. The rest of the circuitry in the lower right of FIG. 6 controls the deposition of data onto the bi-directional bus which is a part of the communication pathway connecting the pre-processor to the pre-processor computer interface.

TABLE II

Charge-well ROM (3 bit address)

| contents | symbol | well controlled |
|---|---|---|
| address: 0 1 2 3 4 5 6 7 | | |
| 0 0 0 0 1 1 0 0 | $V_L$ | photo-sensitive light well |
| 1 1 1 0 0 1 1 1 | $V_{LP}$ | barrier between light and positive wells |
| 0 0 1 1 0 0 0 0 | $V_P$ | positive (storage) well |
| 1 0 0 1 1 1 1 1 | $V_{PN}$ | barrier between positive & negative wells |
| | $V_N$ | negative potential well (always on) |
| 0 0 0 0 0 0 1 0 | $R_L$ | reset (drain charge from) L well |
| 1 0 0 0 0 0 1* 0 | $R_N$ | reset (drain charge from) N well |
| 0 0 0 0 0 0 0 1 | $V_S$ | sum and sample (normal operation) |

*value ANDed with differential flag (0 if differential, 1 otherwise)

An exemplary logic circuit 701 associated with each pixel is illustrated in FIG. 7. Generally, each pixel is associated with a digital memory element, such as a latch 703, to store a number to associate the pixel with a region of interest, a circuit, such as a comparator 705, to determine if the numeric value stored in memory is equal to the value on the digital data bus 707, and circuits to transfer signal charges. The configuration of the energy wells 709 of FIG. 7 are shown in greater detail in FIG. 8.

As shown in FIG. 7, the system counts numerically to sequence through each region of interest once. Here, the digital data bus 707 distributes the count value that encodes the current region of interest to all pixels. Each pixel location is the site of an "ROI latch" 703 (typically 8 bits) that identifies each pixel with a region of interest. ROI latch data can, for example, be stored in a serial mode where the output of one latch 703 is connected to the input of the next latch 703 to minimize address logic and data paths, thereby allowing for increased efficiency of light collection. When a new value is stored in the pixel array (output from the computer to address 0 according to Table I), the contents of each ROI latch 703 are shifted to the next latch 703 and each bit is momentarily stored on a memory element, such as a capacitor, thereby freeing up the first pixel latch 703. Since the computer knows the sequence of connections between the serial ROI latches 703, any region of interest shape/pattern can be loaded into the pre-processor array using this "forward and store" scheme.

When the numeric value of the pre-processor ROI latch 703 matches that of the digital data bus 707, charges in the energy wells 709 proportional to signal intensity are transferred to the analog bus 711. Here, it is understood that electromagnetic radiation is converted in electromagnetic radiation sensitive regions into free charges and stored in energy wells 709 defined in the semiconductor material. The charges accumulated in the energy wells 709 are enabled to distribute on positive and negative leads of the analog bus 711 by controlling the gates of transistors 713. Simultaneously, all other pixels of the same region of interest contribute charges to the same analog bus 711. The result is an algebraic analog summation of charges on each of the positive and negative leads.

The summed charge associated with all pixels of a given region of interest is then converted to a voltage and amplified by an amplifier 715. The voltage is then typically applied to an analog-to-digital converter, which may be separate from the preprocessor chip or integrated into the pre-processor chip, and transferred to the memory of the computer. In order to detect small changes in signal intensity on a significant background signal, a voltage offset under computer control can optionally be applied prior to signal amplification using the offset control circuit of FIG. 5.

It might be noted that charges in the positive (and negative) wells are re-distributed to an average charge in all ROI wells by this process. If charges in the positive well are transferred to the negative well and re-used during differential recording, the summed charge for each region of interest remains the same, and the information lost by the re-distribution of charges does not affect the output of the pre-processor if capacitances of the bus leads are compensated.

During each frame, the process is repeated for each region of interest in the frame. Once all regions of interest are processed, charges from all light sensitive regions are transferred simultaneously to adjacent storage wells as described with reference to FIG. 8.

Typically, seven clock cycles are needed in the cycle discussed above with reference to FIG. 8. That is, each frame requires seven clock cycles in addition to the number of regions of interest. Therefore, the total frame rate is given by:

$$\text{TOTAL FRAME RATE} = \frac{\text{CLOCK RATE}}{(\text{NO. OF } ROIs) + 7} \quad (1)$$

Therefore, if modern VLSI designs can have clock rates in excess of 150 million cycles/second, frames rates exceeding 1 million frames per second can be achieved.

Figure 9:
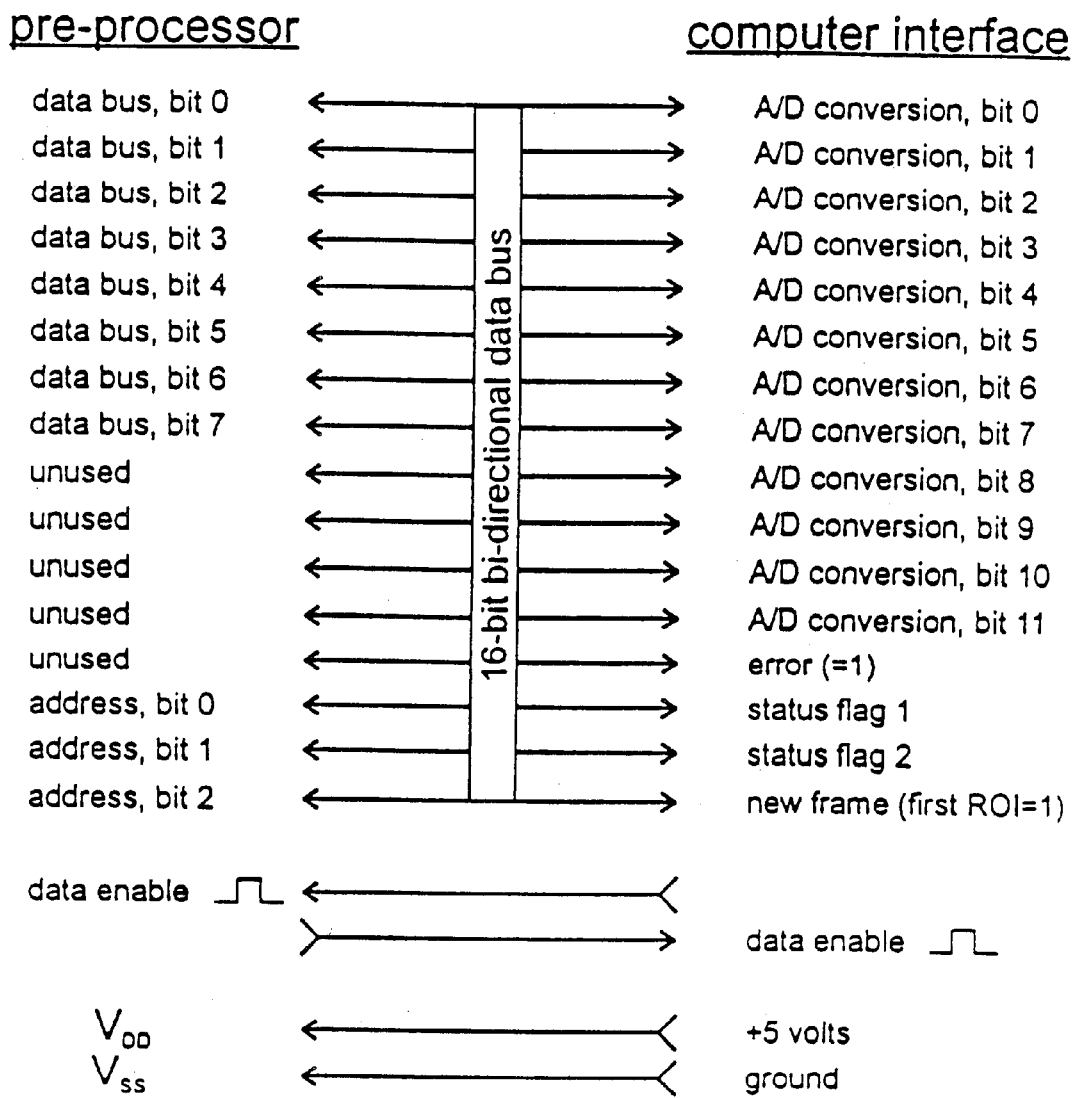
FIG. 9 shows a configuration of a communication pathway according to an embodiment of the present invention.

As described above with reference to FIG. 1, the pre-processor and the processor are connected via a communications pathway and the pre-processor interface. Typically, communication can be performed via a multi-wire cable; however, wireless communication can be utilized or direct circuit interconnections can be used when the computer/controller is incorporated in the pre-processor circuit. Further, the communication can be serial or parallel as desired. One example of the wiring of a cable connecting a pre-processor and a computer is illustrated in FIG. 9. The cable is a 16 bit bi-directional cable, but can be reduced to a 1 or 2 bit tri-state data bus, or other suitable type. Optionally, power can be provided to the pre-processor from the computer interface using the cable.

Figure 10:
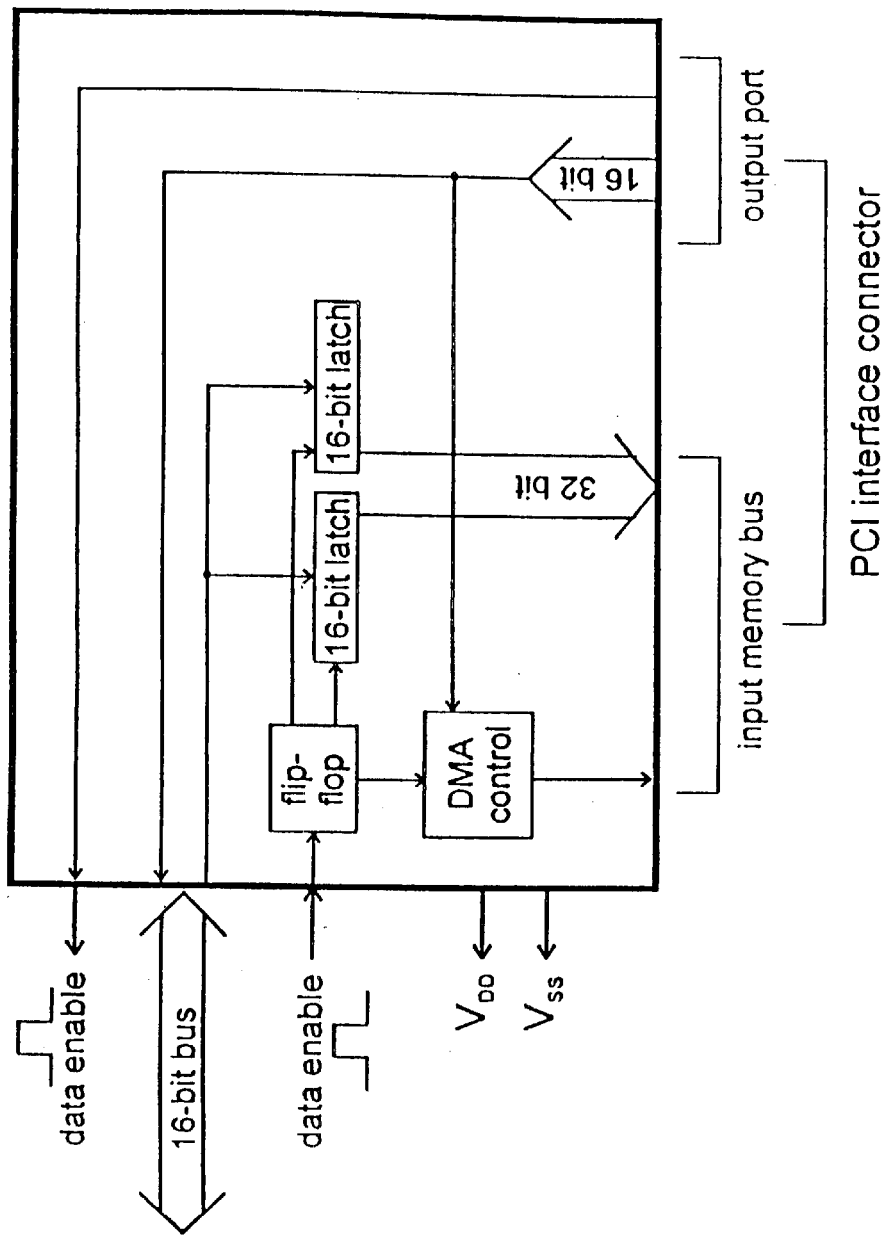
FIG. 10 shows an imaging pre-processor interface according to an embodiment of the present invention.

The overall organization of an example of a high-rate imaging pre-processor interface card is shown in FIG. 10. In the case of desktop computers, commercially available chipsets are available to interface the standard PCI (Peripheral Component Interconnect) bus to peripherals such as the high-rate imaging pre-processor. Here, circuitry assembles data from the pre-processor into 32-bit or 64-bit words suitable for direct memory access (DMA) via the PCI bus. In addition, circuitry sequences outgoing data from the computer with incoming data from the pre-processor.

As described above, one embodiment of the processor is a computer which is software controlled. Exemplary functions performed by software include: i) defining the regions of interest and sending them to the pre-processor, ii) acquisition and storage of data at the high rates generated by the image processing system of the present invention, iii) displaying data (or at least selected data) in an on-line manner, and iv) computing measurements and more complex displays according to data acquired. General-purpose software can be developed to meet a wide variety of applications, particularly functions i–iii above. Other applications might require application specific measurements and displays to be performed. Analysis at extremely high rates requires a high-performance computer. In contrast, when used in dedicated or single-chip computer applications, region of interest can be pre-set at the time of manufacture in order to perform specific sets of measurements. Some examples of software capabilities will now be described.

In the image processing technique of the present invention, one can make arbitrarily complex regions of interest as defined by a micro-computer. This feature is particularly enhanced in consideration of the computing power and graphics capabilities of a computer. Regions of interest can be arbitrary in shape, size, or location. In addition, regions of interest can be varied during the course of an application in a pre-programmed fashion or dependent upon on-line results within a sequence of images. Accordingly, regions of interest can be formed based on irregularly-shaped objects within images using predefined shapes, grid or repeat patterns, using objects within images that meet pre-defined criteria, using any of a wide range of image processing techniques, using manually entered shapes from a mouse or other pointing device (e.g. in FIG. 3B regions 1 and 3 were manually "cut apart"), or using any combination of these approaches.

Simultaneously collected regions of interest can be displayed in graphic form similar to the time signatures of FIGS. 4A through 4D. Many of the operations common to multi-channel oscilloscopes are possible during data acquisition. Displays can be synchronized using an external "trigger" supplied on the 'status 1' and/or 'status 2' inputs. Alternatively, displays can be synchronized by "triggering" (e.g. detection of a threshold intensity) on any of the ROI channels or a fixed time-base can be specified by the user. During extremely high-rate data collection, only selected sweeps might be displayed in order to devote more computational resources to data storage. The storage of data can be triggered by the occurrence of an event on one of the ROI channels or status lines, for example, when measuring the velocity of a projectile. This would be similar to the "single sweep" function using an oscilloscope. Also, high-pass, band-pass and/or low-pass filtering, under some conditions equivalent to integration or differentiation, can be preformed on each channel. Software-controlled offset and gain control, in addition to the offset and gain provided in the pre-processor hardware, are also possible for each channel.

Because of the computational and storage capabilities offered by current computers, more complex forms of data analysis can be performed. Accurate measures of the sequence and time of events can be determined within and among all of the ROI channels and the status lines. By determining optical magnification, the distance between any pair of regions of interest can be calculated. This allows many combinations of conduction velocities to be computed. By comparing the wave forms, using any of a number of cross-correlation algorithms, both in time using a single ROI channel or among all ROI channels, it is possible to determine the occurrence of anomalous events. Using continuous digital data storage techniques, such as circular buffering, one can retrieve the sequence of events that lead to the anomalous behavior. A number of other more sophisticated analyses are possible. Many of these are specific to particular applications.

While the foregoing descriptions describe specific embodiments of the present invention, numerous variations of the present invention are possible according to the application requirements. For example, detecting elements can be used to sense a wide range of electromagnetic radiation including visible light, X-rays (soft and hard), ultraviolet and heat. The number of lines within the digital data bus can be altered to meet requirements for the maximum number of regions of interest to trade off the number of circuit elements in the sensing area which can reduce collection efficiency. The number of bits in the counter that controls clock rate can be adjusted to meet timing needs. The number and size of sensing elements pixels) can be altered to meet specific resolution and sensitivity requirements. In addition, the geometry and placement of pixels is not limited to rectangular grids, but can be completely arbitrary in form such as individual lines, circular regions, or regions of increased densities of pixels. Charge wells to enable differential images can be included/excluded according to image requirements. Individual pixels can be assigned to multiple regions of interest, for example, by modifying the "comparator" of FIG. 7 to ignore 1 or more digital data bus bits. Although the embodiments described above use the CMOS foundry processes, any or all of the circuitry can be implemented using other foundry processes to implement designs. The number of data lines in the communications interface can be altered to meet data transfer rate versus ease of use requirements, such as cable weight and flexibility. In fact, as a preferred embodiment for all but the highest data transfer rates, a "serial" interface scheme can be utilized which reduces the communications cable to four wires. Further, the communications interface can consist of physical "wires" or make use of "wireless" transmission. Amplification, voltage offset, and number of bits of resolution of the analog-to-digital converter, which is 12 bits in FIG. 5, can be adjusted to meet signal sensitivity and intensity requirements.

The interface in not limited to desktop computers. For certain applications, even greater image-processing rates and analysis capabilities can be attained by interfacing with more powerful computers. On the other hand, small "single chip" computers or controllers can be used in dedicated applications, such as online monitoring of engine performance.

Data acquisition and processing can be performed via any number of integrated circuits or components. For example, A/D conversion and even the computer/controller can be incorporated within the same pre-processor integrated circuit as the sensing elements. Algorithms for data analysis can be general purpose to operating much like a multichannel oscilloscope or specific measurements can be automatically made for applications such as conduction velocity, displacement, rotational or vibrational frequency.

In accordance with the foregoing descriptions, the computerized high-rate imaging system offers numerous advantages. The ability to simply point a pre-processing "camera" to analyze the dynamics of objects that are moving or changing rapidly over time greatly simplifies test instrumentation in terms of setup, complexity, and/or reliability. In addition, the high-rate pre-processor "camera" can be a miniature device that is easy to handle or to place in small compartments, for example, within machinery. Also, the controlling computer can be as small as a single-chip device incorporated within the same integrated circuit as the sensor or as extensive as a super computer. Further, imaging provides a minimal distortion of the objects being measured. This is an improvement over, for example, accelerometer based measurements of vibration where the mass of the measuring device produces at least some effect on the objects being tested. Accelerometer based designs also rely on assumptions regarding initial conditions to determine displacement from acceleration. In contrast, the inventive system provides a direct measure of displacement from which velocity, acceleration, and other parameters can be computed.

In the present invention, the circuitry can be fabricated using CMOS/VLSI technology which is currently one of the most common and least expensive fabrication techniques in the electronics semi-conductor industry. Moreover, current CMOS/VLSI technology can be adapted to sense a wide spectral range including visible light, ultraviolet, X-ray, infrared, etc. Accordingly, the imaging system of the present invention can be used in many desired spectral ranges.

In many applications, continuous, real-time, on-line monitoring of multiple channels of information is essential. Here, the conversion of data directly into a format that can be processed by a computer or controller allows operations to be performed based on any pre-programmed criteria. For example, whenever a fault is detected, the computer might permanently store data from the sequence of frames that lead up to the fault.

Data can initially be displayed in a "user friendly" format much like a common multi-channel oscilloscope. Data can then be further processed to perform more sophisticated measurements. Accordingly, highly controlled and accurate measurements can be made with respect to time and space. The resolution of signal intensity, for example, incident light, is also enhanced since the summing of charges from many individual pixels tends to average random sources of noise.

The ability to establish multiple regions of interest within the field of view that are completely arbitrary in qualities such as size, shape, and location allows an essentially limitless number of potential configurations. Further, the ability to rapidly change the regions of interest in response to the incoming data stream further extends applications.

It will be apparent to those skilled in the art that various modifications and variations can be made in the method and system for computerized high-rate imaging of the present invention without departing from the spirit or scope of the invention. Thus, it is intended that the present invention cover the modifications and variations of this invention provided they come within the scope of the appended claims and their equivalents.

What is claimed is:

1. A method for image processing, comprising the steps of:
    receiving electromagnetic radiation on an optical detector;
    defining at least a first region of interest within a field of view of the detector, a portion of the detector corresponding to the first region of interest having at least first and second detecting elements;
    producing first and second electrical detection signals from the first and second detecting elements, respectively, each of the electrical detection signals corresponding to an amount of electromagnetic radiation received on a corresponding one of the detecting elements; and
    analog summing the first and second electrical detection signals to produce an analog output signal.

2. The method for image processing according to claim 1, wherein the first and second detecting elements comprise a subset of a two-dimensional array of detecting elements.

3. The method for image processing according to claim 1, wherein the electrical detection signals are analog.

4. The method for image processing according to claim 3, further comprising the step of converting the output signal into a digital signal.

5. The method for image processing according to claim 1, wherein the region of interest is one of contiguous and non-contiguous.

6. The method for image processing according to claim 1, wherein the electrical detection signals are accumulated charges and the output signal is a voltage.

7. The method for image processing according to claim 1, further comprising the steps of:
    receiving electromagnetic radiation on a second portion of the detector having at least third and fourth detecting elements, wherein the second portion corresponds to a second region of interest within the field of view, the second region of interest being distinct from the first region of interest;
    producing third and fourth electrical detection signals from the third and fourth detecting elements, respectively, each of the first through fourth electrical detection signals corresponding to an amount of electromagnetic radiation received on respective ones of the first through fourth detecting elements; and
    summing the third and fourth electrical detection signal to produce a second output signal.

8. The method for image processing according to claim 7, wherein the step of summing the first and second electrical detection signals is repeated to produce repeated output signals.

9. The method for image processing according to claim 8, wherein each one of the repeated output signals correspond to absolute amounts of electromagnetic radiation received from the first region of interest.

10. The method for image processing according to claim 8, wherein each one of the repeated output signals corresponds to a change in the amount of electromagnetic radiation received from the first region of interest.

11. The method for image processing according to claim 8, wherein the step of summing the third and fourth electrical detection signals is repeated to produce repeated second output signals.

12. The method for image processing according to claim 8, further comprising the step of determining a time signature from the repeated output signals.

13. The method for image processing according to claim 7, wherein the first and second regions of interest are arranged along a direction of interest.

14. The method for image processing according to claim 7, wherein the second region of interest is arranged about the first region of interest to detect translational motion.

15. The method for image processing according to claim 7, wherein the second region of interest is arranged about the first region of interest to detect rotational motion.

16. A system for image processing, comprising:
    an optical detector including at least first and second detecting elements for receiving electromagnetic radiation;
    means for defining at least a first region of interest within a field of view of the detector, the first region of interest being imaged onto a portion of the detector having the first and second detecting elements;
    means for producing first and second electrical detection signals from the first and second detecting elements, respectively, each of the electrical detection signals corresponding to an amount of electromagnetic radiation received on a corresponding one of the detecting elements; and
    means for analog summing the first and second electrical detection signals to produce an analog output signal.

17. The system for image processing according to claim 16, wherein the first and second detecting elements comprise a subset of a two-dimensional array of detecting elements.

18. The system for image processing according to claim 16, wherein the electrical detection signals are analog.

19. The system for image processing according to claim 18, further comprising a converter for converting the output signal into a digital signal.

20. The system for image processing according to claim 16, further comprising:
    third and fourth detecting elements included in the detector each for receiving electromagnetic radiation, wherein the the defining means defines a second region of interest within the field of view that is distinct from the first region of interest, and wherein the third and fourth detecting elements correspond to the second region of interest;
    means for producing third and fourth electrical detection signals from the third and fourth detecting elements, respectively, each of the first through fourth electrical detection signals corresponding to an amount of electromagnetic radiation received on a corresponding one of the detecting elements; and
    means for summing the third and fourth electrical detection signal to produce a second output signal.

21. The system for image processing according to claim 16, wherein the means for summing the first and second electrical detection signals repeatedly sums the first and second electrical detection signals to produce repeated output signals.

* * * * *